US010542673B2

United States Patent
Rayfield et al.

(10) Patent No.: US 10,542,673 B2
(45) Date of Patent: Jan. 28, 2020

(54) AGRICULTURAL REEL CAM SYSTEM

(71) Applicant: CNH Industrial America LLC, New Holland, PA (US)

(72) Inventors: James F. Rayfield, New Holland, PA (US); Ryan M. Figgins, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 548 days.

(21) Appl. No.: 15/058,853

(22) Filed: Mar. 2, 2016

(65) Prior Publication Data

US 2016/0255773 A1    Sep. 8, 2016

Related U.S. Application Data

(60) Provisional application No. 62/126,782, filed on Mar. 2, 2015.

(51) Int. Cl.
*A01D 43/02* (2006.01)
*A01D 57/03* (2006.01)
*A01D 101/00* (2006.01)

(52) U.S. Cl.
CPC .......... *A01D 57/03* (2013.01); *A01D 2101/00* (2013.01)

(58) Field of Classification Search
CPC ............................ A01D 57/03; A01D 2101/00
USPC .......................................................... 56/167
See application file for complete search history.

(56) References Cited

U.S. PATENT DOCUMENTS

| | | | | |
|---|---|---|---|---|
| 3,849,974 A | * | 11/1974 | James | A01D 57/03 56/14.4 |
| 4,067,177 A | * | 1/1978 | Tout | A01D 57/03 56/226 |
| 4,156,340 A | * | 5/1979 | Colgan | A01D 57/03 56/226 |
| 4,751,809 A | * | 6/1988 | Fox | A01D 57/02 56/220 |
| 5,987,861 A | * | 11/1999 | Duncan | A01D 57/03 460/142 |
| 6,502,379 B1 | * | 1/2003 | Snider | A01D 57/02 56/221 |
| 6,530,202 B1 | | 3/2003 | Guyer | |
| 6,591,598 B2 | | 7/2003 | Remillard et al. | |
| 6,698,175 B1 | | 3/2004 | Schumacher et al. | |
| 6,708,475 B2 | | 3/2004 | Guyer | |

(Continued)

FOREIGN PATENT DOCUMENTS

EP    1297736 A1    4/2003

*Primary Examiner* — Thomas B Will
*Assistant Examiner* — Mai T Nguyen
(74) *Attorney, Agent, or Firm* — Peter K. Zacharias; Patrick M. Sheldrake

(57) ABSTRACT

An agricultural processing system including a chassis with a header coupled to the chassis. The header provides for the ingathering of agricultural product into the processing system. The header including a reel system having a plurality of arms rotationally coupled to the header. The plurality of arms include a first arm and a second arm. There is a cam track coupled to the header. The first link is pivotally coupled to the first arm and a roller is rotatably coupled to the first link, with the roller rollingly following the cam track. A tine bar is pivotally coupled to the second arm. The second link is pivotally coupled to both the first link and to the tine bar.

6 Claims, 4 Drawing Sheets

(56) References Cited

U.S. PATENT DOCUMENTS

| | | | |
|---|---|---|---|
| 6,843,045 B2 | 1/2005 | Bickel | |
| 7,131,253 B2 * | 11/2006 | Remillard | A01D 57/02 56/14.4 |
| 8,387,351 B2 | 3/2013 | Guyer | |
| 8,863,489 B2 * | 10/2014 | Landon | A01D 57/28 56/192 |
| 9,730,389 B2 * | 8/2017 | Jones | A01D 57/03 |
| 9,775,295 B2 * | 10/2017 | Remillard | A01D 57/02 |
| 9,807,935 B2 * | 11/2017 | Honey | A01D 57/02 |
| 2015/0272001 A1 * | 10/2015 | Honey | A01D 34/01 56/158 |
| 2015/0313081 A1 | 11/2015 | Jost et al. | |

\* cited by examiner

AGRICULTURAL REEL CAM SYSTEM

CROSS REFERENCE TO RELATED APPLICATIONS

This is a non-provisional application based upon U.S. provisional patent application Ser. No. 62/126,782, entitled "AN AGRICULTURAL HARVESTER REEL CAM SYSTEM", filed Mar. 2, 2015, which is incorporated herein by reference.

BACKGROUND OF THE INVENTION

1. Field of the Invention

The present invention relates to agricultural vehicles such as combines and windrowers, and, more particularly, to reel systems used in such vehicles.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material, such as straw, from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

The header performs the task of ingathering of the crop material, and for small grain the header typically includes tines that contact some of the crop material to ensure that it engages a cutter bar. In the case of a combine, the cut crop material is moved toward a transport mechanism which takes the crop material to the threshing system. Headers can also be included on other agricultural processing systems, such as windrowers, to cut hay or small grain crops and form the cut crop material into a windrow that is deposited on the ground for drying. The tines can be mounted to a beam, such as a tube, linked to a rotating element, such as a shaft, to rotate the tines and direct crop material toward the cutter bar and transport mechanism. To control pivoting of the tines as they rotate, the tine tube is typically linked to a cam, such as a roller, that follows a cam track mounted to the header.

One problem with known reel cam systems is the cam track typically has a portion which extends in front of the tube linked to the rotating element. During operation of the header, the front-most portion of the cam track extending out past the tube impedes crop flow to the cutter bar and transport mechanism. This impediment lowers the crop material gathering rate of the header.

What is needed in the art is a reel/cam system the keeps the cam track away from the crop material as crop material is being gathered.

SUMMARY OF THE INVENTION

The present invention provides a system and method of controlling the tines of a reel used with an agricultural processing system that reduces the impediment of crop material gathering caused by the cam track.

The invention in one form is directed to an agricultural processing system including a chassis with a header coupled to the chassis. The header provides for the ingathering of agricultural product into the processing system. The header includes a reel system having a plurality of arms rotationally coupled to the header. The plurality of arms include a first arm and a second arm. There is a cam track coupled to the header. The first link is pivotally coupled to the first arm and a roller is rotatably coupled to the first link, with the roller rollingly following the cam track. A tine bar is pivotally coupled to the second arm. The second link is pivotally coupled to both the first link and to the tine bar.

The invention in another form is directed to an agricultural processing system including a chassis and a header coupled to the chassis, the header providing for the ingathering of crop material into the processing system. The header has a reel system including: a plurality of arms rotationally coupled to the header and configured to rotate about a central axis; a cam track coupled to the header, the cam track defining a plurality of cam distances relative to the central axis, the cam track having a front portion and a rear portion, the rear portion defining at least one cam distance greater than any cam distances of the front portion; a tine bar pivotally coupled to at least one of the plurality of arms; and a roller coupled to the tine bar, the roller rollingly following the cam track.

An advantage of the present invention is the cam track does not extend in front of the tine bar, which reduces impediment of crop material gathering.

Another advantage of the present invention is the cam track can allow the tines to gather crop material in front, deliver the crop material to a transport mechanism, release the crop material, and flip between the release point and the front to prevent wrappage.

Yet another advantage of the present invention is the tine bar can trail its associated roller following the cam track.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplification set out herein illustrates embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
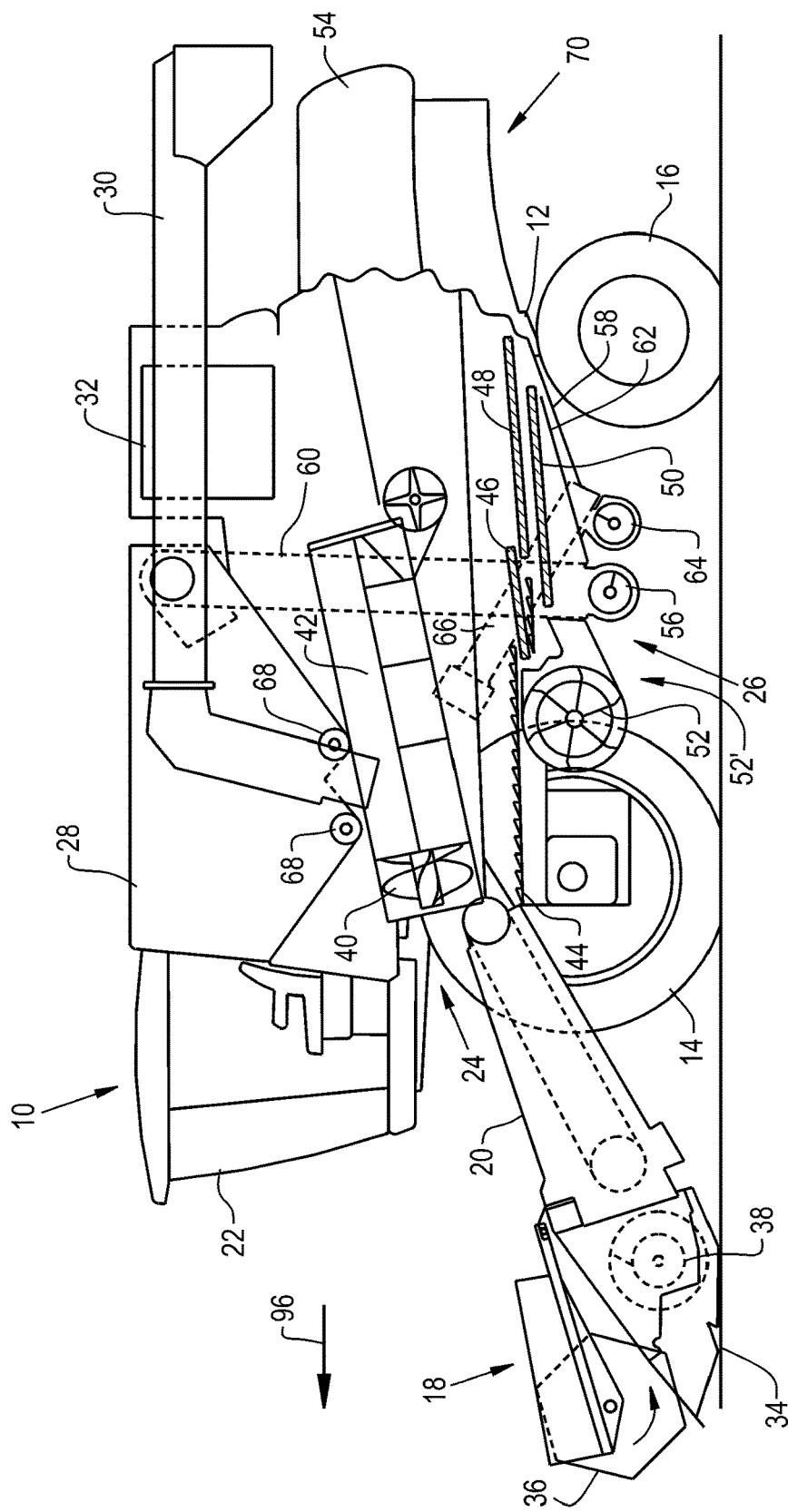
FIG. 1 is a side view of an embodiment of an agricultural vehicle in the form of a combine which includes an embodiment of a reel/cam system of the present invention.

Referring now to the drawings, and more particularly to FIG. 1, there is shown an agricultural processing system in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. While the header 18 according to the present invention is shown mounted to the front of a combine harvester 10 in FIG. 1, the header 18 can also be mounted to the front of a different agricultural processing system, such as a self-propelled windrower. A rotatable reel 36 feeds the crop into header 18, and a conveying device 38 feeds the severed crop laterally inwardly from each side toward feeder housing 20. In the case of a self-propelled windrower, the conveying device would feed the severed crop toward a center opening in the header. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 may include a chopper, counter knives, a windrow door and a residue spreader.

Figure 2:
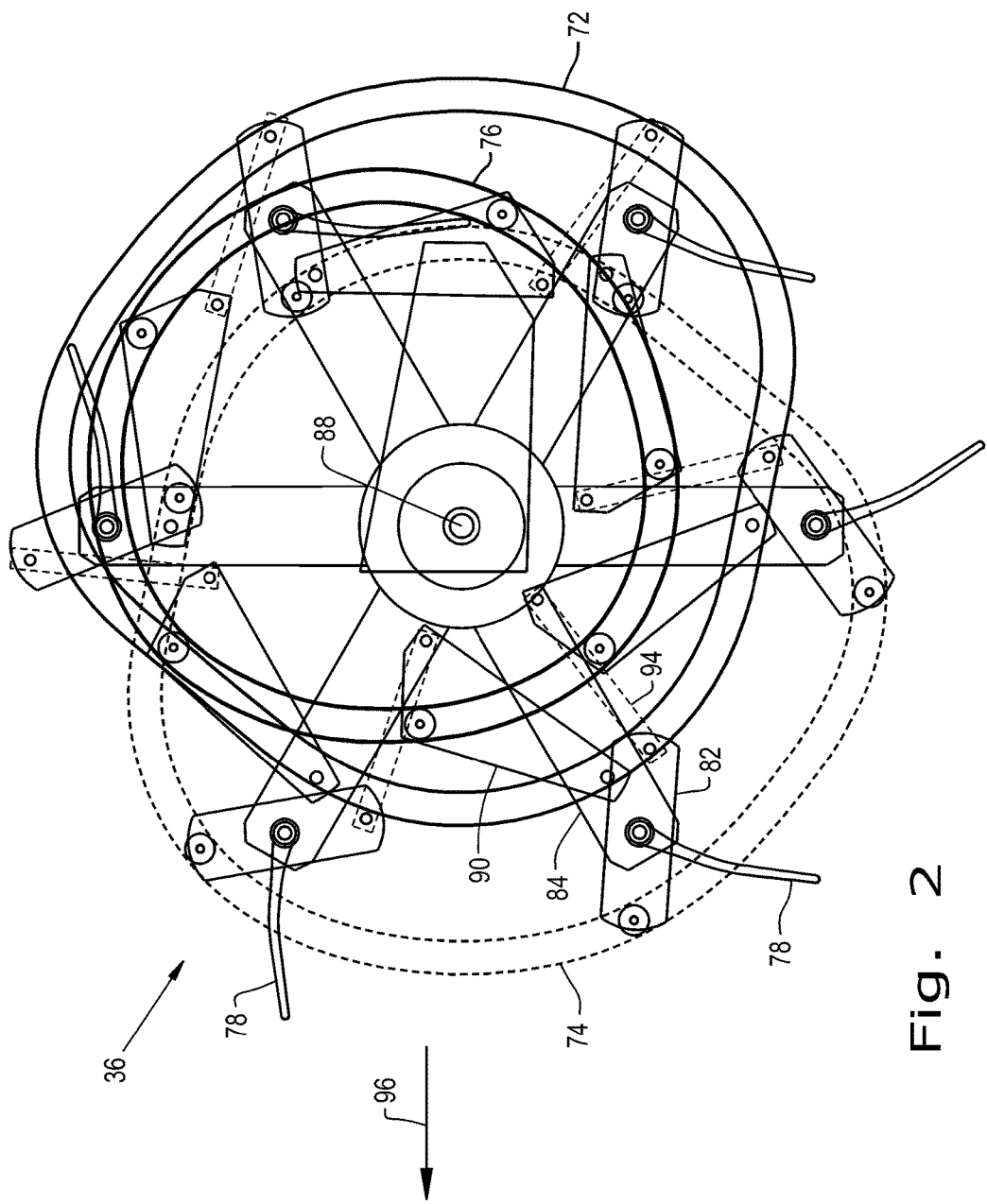
FIG. 2 is a side view schematical representation of two embodiments of a cam track included in the reel/cam system of the present invention in the harvester of FIG. 1, superimposed over a prior art cam track illustrated in dashed lines.

Now, additionally referring to FIG. 2 reel 36 is shown with three cam tracks 72, 74 and 76. The cam track 74, which is illustrated in dashed lines, represents a prior art cam track with a portion that defines the front-most portion of the reel 36 in a direction of forward travel 96. Cam track 72, on the other hand, represents cam track 74 flipped 180 degrees so the cam track 72 does not define a front-most portion of the reel 36 in a direction of travel. Cam track 72 does not impede crop to the same degree as the prior art cam track 74. However, if a tine bar is directly connected to the roller following the cam track 72, the tine bar will lead the roller in some portions of the cam track. When it is preferred to have the tine bar following the roller, cam track 76 can be employed with a linkage system to the tine bars, which is discussed further herein, that allows the rollers following the cam track 76 to lead the tine bars while also having a front-most portion of the cam track 76 be behind the tine bars in the direction of travel.

Figure 3:
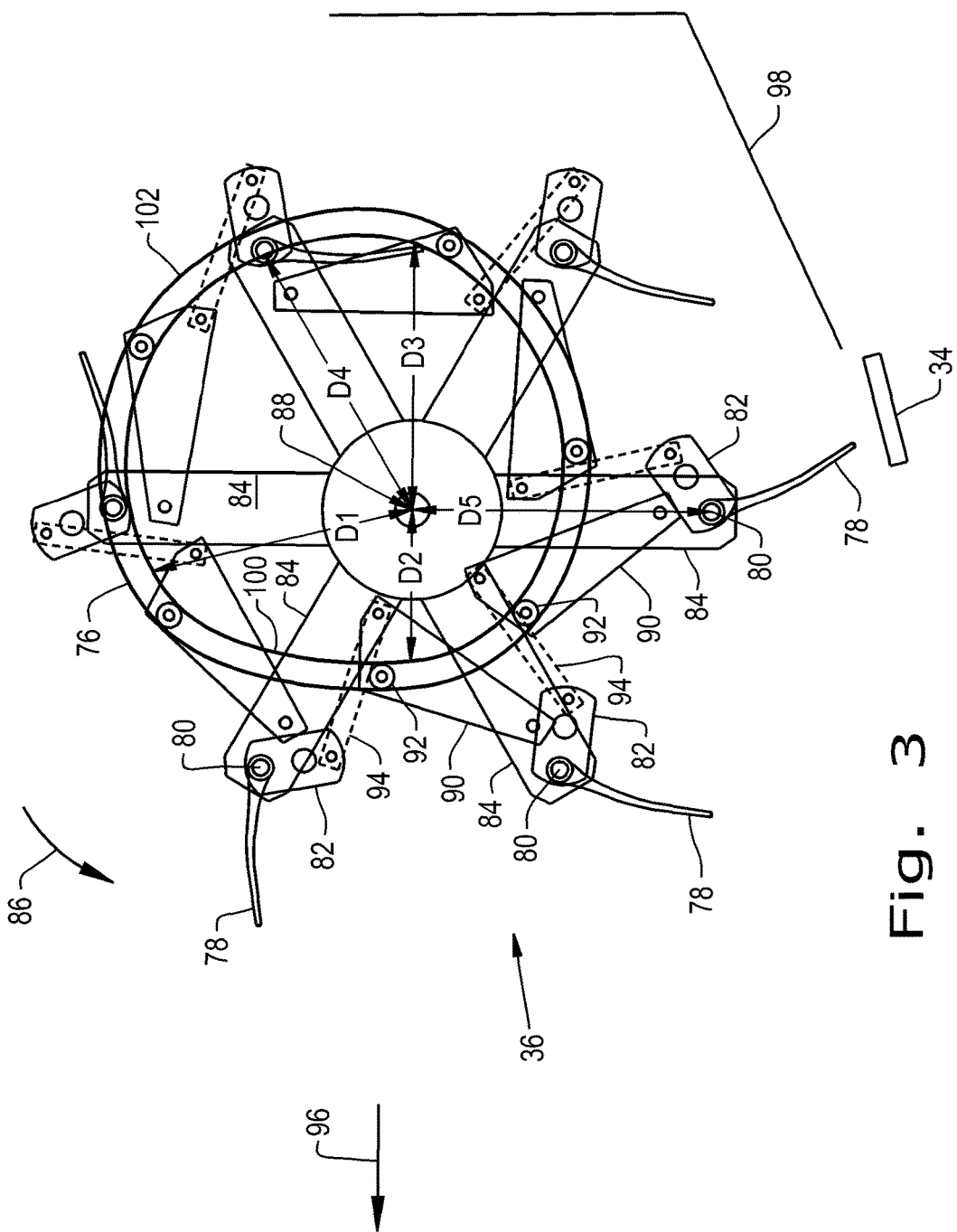
FIG. 3 is a simplified schematical side view of one of the embodiments of a cam track formed according to the present invention that is shown in FIG. 2.

Now, additionally referring to FIG. 3, there is shown a simplified view of an embodiment of the present invention which includes the cam track 76 shown in FIG. 2. Reel 36 has tines 78, coupled to pivoting tine bars 80, which can also be referred to as "tine tubes," that have a mounting bar 82 coupled thereto. Reel 36 has arms 84, which are rotated in direction 86 about a central axis 88, that can each have a tine bar 80 pivotally coupled thereto. A link 90 is pivotally connected to an arm 84 and has a roller 92 that follows cam track 76, and a link 94 is pivotally connected to link 90 and with a mounting bar 82 which is associated with an adjacent following (relative to direction 86) arm 84. As arms 84 rotate link 90, which is pivotally connected to an arm 84, is pulled so that roller 92 follows in cam track 76. The shape of cam track 76 causes link 90 to move so as to cause link 94 to vary its position and hence the pivotal positions of mounting bar 82 as well as pivoting tine bars 80 and the angular position of tines 78.

As agricultural vehicle 10 moves in a forward direction 96, reel 36 rotates in direction 86 and tines 78 are positioned to ingather the crop, bringing it to cutter bar 34 for cutting. After the crop is cut it is positioned on a belt 98 (or it engages auger 38) and proceeds to the threshing section 24. As the crop transitions from cutter bar 34 to belt 98 the tines 78 pivot back away from the crop as can be seen in FIG. 3. The tines 78 then pivot forward as they rotate on reel 36 so that they are substantially extended as the arms 84 start to come down toward the crop. To achieve this movement of the tines 78, the cam track 76 can have a front portion 100 located in front of the central axis 88 in the forward direction 96 and a rear portion 102 located behind the central axis 88 in the forward direction 96, with the front portion 100 and rear portion 102 defining a plurality of cam distances D1, D2, D3, D4 relative to the central axis 88. As can be seen, the rear portion 102 can have a maximum cam distance D4, which is the greatest distance of the cam track 76 relative to the central axis 88, which is greater than any cam distances D1, D2 of the front portion 100 such that at least a portion of the rear portion 102 of the cam track 76, for example at maximum cam distance D4, extends beyond a portion of the tine bars 80 (FIG. 3). In other words, the rear portion of the cam track 76 extends beyond the circular perimeter of the tine bars 80 such that the rollers 92 travel beyond the tine distance D5 during a portion of the rear portion 102 of the cam track 76. This configuration of the cam track 76 forces the tine bars 80 to pivot tips of the tines 78 inward toward the central axis 88 as the rollers 92 roll along the rear portion 102 of the cam track 76, and pivot outward away from the central axis 88 as the rollers 92 roll along the front portion 100 of the cam track 76. In this sense, it is the combination of the tine bars 80 each being mounted an equal tine distance D5 from the central axis 88 and the asymmetry of the cam distances D1, D2, D3, D4 of the cam track 76 relative to the central axis 88 that causes the desired pivoting of the tine bars 80. It should therefore be appreciated that while the cam track 76 is shown as being an irregular circular shape that is arranged asymmetrically about the central axis 88, a similar effect could be achieved by arranging an irregular circular cam track centrally about the central axis 88 or by arranging a regular circular cam track asymmetrically about the central axis 88, i.e., so the circular cam track is not centered about the central axis 88. The maximum cam distance D4 between the cam track 76 and the central axis 88 can be, for example, behind the cutter bar 34.

There can be two similar cam tracks 76, and the associated links and rollers, one on each end of reel 36 to assist in the fluid movement of tines 78.

Figure 4:
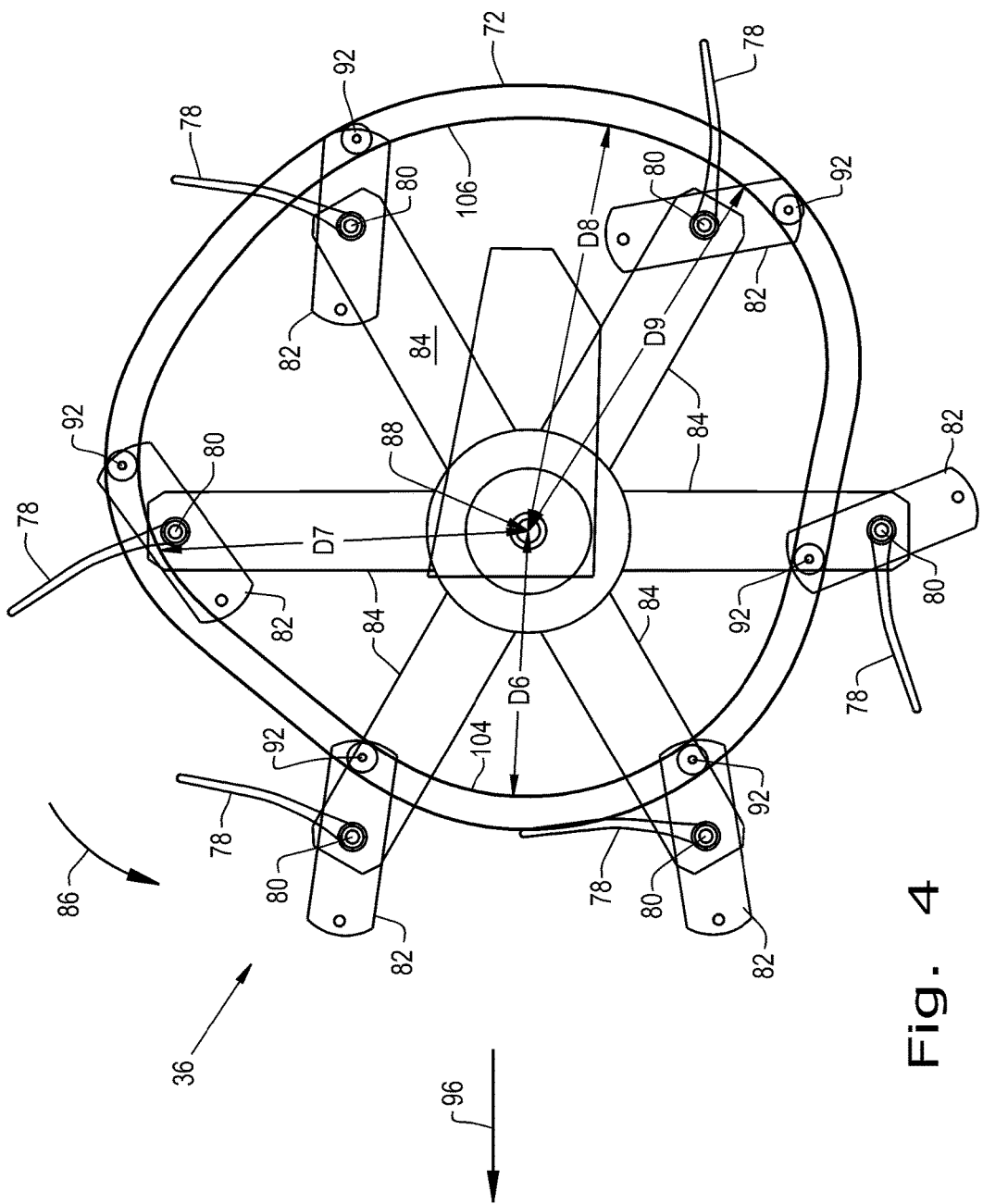
FIG. 4 is a simplified schematical side view of the other embodiment of a cam track formed according to the present invention that is shown in FIG. 2.

Referring now to FIG. 4, an additional embodiment of the present invention is shown which includes the cam track 72 shown in FIG. 2. Similar elements between FIGS. 3 and 4 are numbered similarly, for ease of reference. As can be seen, the cam track 72 is a 180 degree flip of the cam track 74 so the front-most portion of the cam track 72 does not extend in front of the tine bars 80 in the forward direction 96. Rather than utilizing links 90 and 94, the mounting bars 82 can be elongated to pivotally connect the tine bars 80 to their respective roller 92 following the cam track 72. In this sense, the cam track 72 also has a front portion 104 and a rear portion 106 with a plurality of cam distances D6, D7, D8, D9 relative to the central axis 88, with a maximum cam distance D8 defined between the rear portion 106 and the central axis 88 which is greater than any cam distances D6, D7 of the front portion 104. Such a configuration keeps the front-most portion of the cam track 72 behind the tine bars 80 in the direction of forward travel 96 without the need for the linkage system shown in FIG. 3, but requires a relatively longer cam track 72 compared to cam track 76.

Advantageously the present invention has a cam track 72, 76 that does not extend forward into the crop, thereby eliminating any impediment to the crop flow caused by the cam track. The two links 90 and 94, if included, allow the roller 92 to follow, or be pulled in cam track 76, which can enhance the robustness of the system. The cam track 76 establishes the tine movement pattern so that the tines 78 connected to the tine bars 80 gather the crop material in the front, deliver it to the belt, release the crop and then flip back at the top of their movement to prevent wrapping of the crop material around the tine bars.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural processing system, comprising:
   a chassis;
   a header coupled to said chassis, said header providing for the ingathering of crop material into the processing system, said header including a reel system having:
      a plurality of arms rotationally coupled to said header, said plurality of arms including a first arm and a second arm, and said second arm follows said first arm relative to a direction of rotation of the reel system;
      a cam track coupled to said header and including a front portion and a rear portion;
      a first link pivotally coupled to said first arm;
      a roller rotatably coupled to said first link, said roller rollingly following said cam track;
      a plurality of tine bars, each said tine bar being pivotally coupled to a respective arm of said plurality of arms, said plurality of tine bars including a first tine bar pivotally coupled to said first arm and a second tine bar pivotally coupled to said second arm;
      a plurality of mounting bars including a first mounting bar connected to said first tine bar and a second mounting bar connected to said second tine bar; and
      a second link pivotally coupled to said first link and to said second mounting bar, wherein at least a portion of the rear portion of the cam track extends beyond a portion of said second tine bar.

2. The agricultural processing system of claim 1, wherein a front portion of said cam track does not extend forward of said tine bar in a forward direction of the processing system.

3. The agricultural processing system of claim 1, wherein each of said plurality of arms rotates about a central axis.

4. The agricultural processing system of claim 3, wherein each said tine bar is equidistant from said central axis.

5. The agricultural processing system of claim 3, wherein said cam track defines a plurality of cam distances relative to said central axis.

6. The agricultural processing system of claim 5, wherein said rear portion defines at least one cam distance which is greater than any cam distances defined by said front portion.

* * * * *